United States Patent [19]

Ames

[11] Patent Number: 4,878,809

[45] Date of Patent: Nov. 7, 1989

[54] POWER SOURCE AND CONTROL MECHANISM FOR PROPELLER PITCH CONTROL

[75] Inventor: John E. Ames, Rockford, Ill.

[73] Assignee: Sundstrand Corporation, Rockford, Ill.

[21] Appl. No.: 215,356

[22] Filed: Jul. 5, 1988

[51] Int. Cl.[4] .............................................. B64C 11/32
[52] U.S. Cl. .................................... 416/151; 416/152; 416/160
[58] Field of Search ........................ 416/151, 152, 160

[56] References Cited

U.S. PATENT DOCUMENTS

| | | | |
|---|---|---|---|
| 345,132 | 5/1943 | Florian et al. | 416/160 |
| 2,248,789 | 7/1941 | Setterblade | 416/151 |
| 2,577,603 | 12/1951 | Chillson | 416/151 |
| 2,577,604 | 12/1951 | Chillson | 416/151 |
| 2,609,056 | 9/1952 | Lockheed | 416/152 |
| 3,395,763 | 8/1968 | Avena et al. | |
| 3,665,788 | 5/1972 | Nyman | 74/751 |
| 3,801,219 | 4/1974 | Parsons et al. | 416/16 D X |
| 3,893,789 | 7/1975 | Andrews | 416/160 |
| 3,900,274 | 8/1975 | Johnston et al. | 416/160 X |
| 3,994,128 | 11/1976 | Griswold, Jr. et al. | 60/226 R |
| 4,261,226 | 4/1981 | Orshansky, Jr. et al. | 74/687 |
| 4,578,019 | 3/1986 | Safarik | 416/151 X |
| 4,660,437 | 4/1987 | Scott | 74/675 |
| 4,699,021 | 10/1987 | Waddington | 74/687 |
| 4,750,862 | 6/1988 | Barnes et al. | 416/160 X |

FOREIGN PATENT DOCUMENTS

| | | | |
|---|---|---|---|
| 1173807 | 7/1964 | Fed. Rep. of Germany | 416/152 |
| 3031390 | 2/1982 | Fed. Rep. of Germany | 416/152 |
| 3415428 | 10/1985 | Fed. Rep. of Germany | 416/160 |
| 197499 | 11/1983 | Japan | 416/160 |
| 530633 | 12/1940 | United Kingdom | 416/160 |
| 1251955 | 11/1971 | United Kingdom | 416/160 |

*Primary Examiner*—Everette A. Powell, Jr.
*Attorney, Agent, or Firm*—Antonelli, Terry & Wands

[57] ABSTRACT

A pitch controller (10) for controlling the pitch of a plurality of blades (11) of a fan powered by a turbine propulsion engine, with a pitch adjusting device (16) having an input (18) for controlling the pitch of the blades. An input drive shaft (15) provides rotary power from the free turbine to the first input of a transmission (14). The transmission also has a second input (25) controlling the input to the pitch adjusting device, a first output (18) which is the input to the pitch adjusting device and a second output (21) which is applied to a rotary power device (20). Input power from the free turbine is provided to the rotary power device by the transmission which in response to a pitch control signal (28) causes the second input to rotate at a speed different from the first input thereby changing the pitch of the blades in proportion to the pitch control signal.

21 Claims, 3 Drawing Sheets

FIG. I.

POWER SOURCE AND CONTROL MECHANISM FOR PROPELLER PITCH CONTROL

TECHNICAL FIELD

The present invention relates to aircraft turbine propulsion engines having variable pitch fan sections. More particularly, the present invention relates to apparatus for controlling the pitch of external fan blades of a turbine propulsion engine.

BACKGROUND ART

Recently, aircraft propulsion turbines have been developed having a pair of counter rotating external unshrouded fans. Pitch adjustment in turbines with unshrouded fans is necessary for the safe and efficient operation of the aircraft throughout the flight envelope.

Aircraft turbine propulsion engines with external unshrouded fans in the 20-30,000 horsepower class require 20 or more net horsepower per blade section to achieve the required pitch adjustment change rates at the operating loads. Current designs of unshrouded fan turbines change pitch of the blades by a hydraulic pump-power drive unit combination. The hydraulic pump is driven by power taken by direct mechanical connection to the turbine main shaft to produce pressurized hydraulic fluid which is applied to the remotely located power drive unit by means of hydraulic lines. The pitch adjusting mechanism has an outer shaft which is driven by a free turbine powered by pressurized gas after passage through the turbine section powering the main shaft. The free turbine directly supplies the rotary power for the unshrouded fans and therefore the rotational velocity of the free turbine is directly proportional to the rotational velocity of the blades. The pitch adjusting mechanism also has an inner control shaft concentric with the outer shaft which rotates at a rotational velocity proportional to a charge in pitch specified by a pitch control signal source which produces a signal under pilot or automatic control. A transmission provides the reference and control shafts to the pitch adjusting mechanism. The transmission receives power directly from the rotating blades of the unshrouded fans and also receives an input from the power drive unit which has a rotary velocity proportional to the change in pitch control signal.

The magnitude of the hydraulic horsepower required to vary the pitch of the unshrouded fans is several times that required to power conventional hydraulic loads on aircraft. Because of the intermittent requirements for changing pitch of external unshrouded fans in jet aircraft, the prior art approach of taking hydraulic power from the main hydraulic power supply system to drive the pitch adjusting mechanisms results in extra hydraulic lines and could result in an overall weight penalty. It is necessary with the prior art to size the main hydraulic power system to handle the intermittent hydraulic power demands of the pitch adjusting mechanism and the other conventional loads.

U.S. Pat. Nos. 4,660,437; 4,261,226; 3,994,128; 3,893,789 and 3,395,763 disclose mechanisms for adjusting the pitch of a propeller.

DISCLOSURE OF INVENTION

The present invention provides apparatus for controlling pitch variations of a plurality of blades of a fan in a turbine propulsion engine by a direct power take off from the free turbine power source driving the variable pitch fans which uses a small fraction of the power used in rotating the variable pitch fans. A hydraulic pump-motor combination is driven directly from the free turbine power source used for driving the variable pitch fans and operates under the control of a pitch control signal to provide torque to a known pitch adjusting mechanism for controlling the pitch of the blades of the fan. The direct drive of a hydraulic pump-motor combination from the free turbine power source eliminates the prior art hydraulic lines between the main hydraulic pump powered by the main turbine shaft and the power drive unit and may lessen the overall weight of the control necessary to vary the pitch of the fan blades and simplify control.

A pitch controller for varying pitch of the blades in a fan powered by a turbine in accordance with the invention includes a pitch adjusting mechanism having an input for controlling the pitch of the blades, the pitch being constant in response to rotational velocity of the input and a rotational velocity of a power source applying rotary power to the blades having a fixed velocity ratio and the pitch changing in response to the rotational velocity of the input and the rotational velocity of the power source varying from the fixed ratio; a transmission having a first input from the power source and a second input for controlling rotational velocity of a first output in proportion to a change in velocity of the second input, and a second output; and a mechanism for providing the second input to the transmission, the rotational velocity of the second input to the transmission varying in proportion to change in an applied pitch control signal for controlling the pitch of the blades, the first output of the transmission providing torque to the input of the pitch adjusting mechanism.

The invention has first and second embodiments which differ in the rotational velocity applied to the second input of the transmission. In a first embodiment, the rotational velocity of the second input to the transmission is zero when the pitch control signal is commanding a constant pitch of the fan blades. In a second embodiment, the rotational velocity of the second input to the transmission is fixed and non-zero when the pitch control signal is commanding a constant pitch and varies from the fixed velocity in response to a pitch control signal commanding a change in pitch of the fan blades.

The mechanism for providing the second input to the transmission includes a hydraulic pump powered by the second output of the transmission for providing pressurized hydraulic fluid in response to applied torque, and a hydraulic motor connected to the hydraulic pump for providing rotary power to the second input of the transmission. The pitch control signal may be applied from a pitch control signal source to the hydraulic motor for varying the rotational velocity of the motor in proportion to a pitch control signal to change the pitch of the blades. Alternatively, a pitch control signal may be applied from a pitch control signal source to the hydraulic pump for varying the pressure of the hydraulic pump fluid applied to the hydraulic motor in proportion to a pitch control signal to change the pitch of the blades.

The transmission includes first, second and third sets of gears; the first set of gears being driven by the power source applying rotary power; the second set of gears being driven by the first set of gears, the mechanism for providing the second input to the transmission and driving the first output of the transmission; and the third set of gears being driven by the source for providing rotary power and driving the hydraulic pump.

The first set of gears comprises a first sun gear; a first ring gear; and a plurality of first planetary gears meshing with the first sun gear and the first ring gear, the first ring gear being fixed and the first sun gear being driven by the source of rotary power. The second set of gears comprises a second sun gear, a second ring gear, and a second set of planetary gears meshing with the second sun gear and the second ring gear, the first and second sets of planetary gears orbiting the first and second sun gears, and the second ring gear being driven by the second input for controlling rotational velocity of the first output of the transmission. The third set of gears comprises a third sun gear, and a third set of planetary gears, the third sun gear driving an input drive shaft of the hydraulic pump and the third set of planetary gears orbiting with the first and second sets of planetary gears of the first and second gear sets. Furthermore, the second ring gear has external gear teeth and a first gear, which is driven by the second input for controlling rotational velocity of the first output of the transmission, meshes with the external teeth of the second ring gear.

In a first embodiment of the invention, an identical gear ratio exists between the first set of planetary gears and the first ring gear and the second set of planetary gears and the second ring gear so that the second input to the transmission is non-rotating when the pitch control signal is not commanding a change in the pitch of the fan blades.

In a second embodiment of the invention, a different gear ratio exists between the first set of planetary gears and the first ring gear and the second set of planetary gears and the second ring gear which permits the second input to the transmission to rotate at a non-zero velocity when the pitch control signal is commanding that the pitch of the fan blades is not to change. This embodiment has the advantage of having the output of the hydraulic motor rotating when the pitch control signal is commanding that there is no change to be made in the pitch of the fan blades so as to maintain a hydrodynamic bearing between moveable surfaces at all times.

BEST MODE FOR CARRYING OUT THE INVENTION

Figure 1:
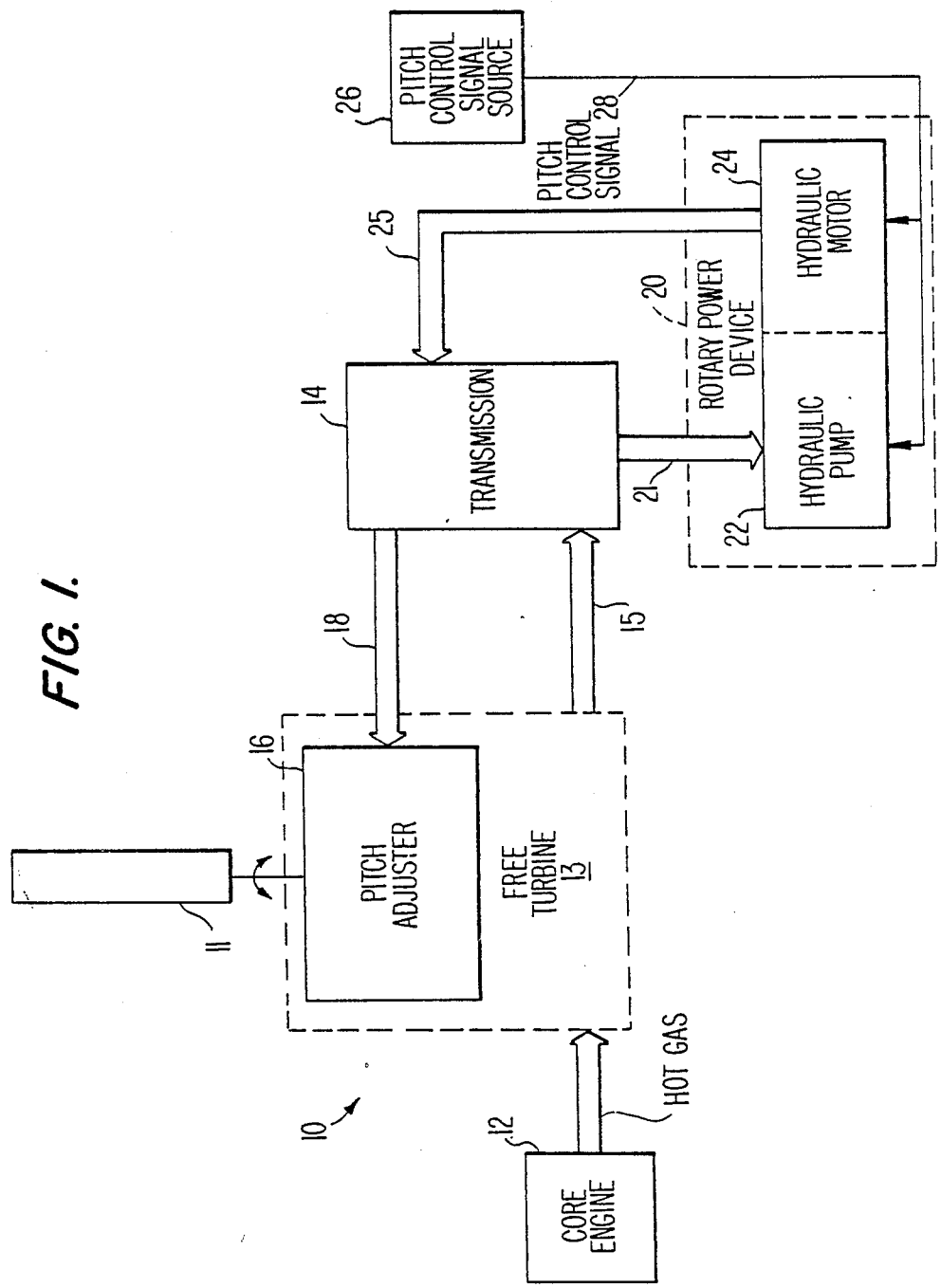
FIG. 1 is a conceptual block diagram of the present invention.

The present invention as shown conceptually in FIG. 1 provides a pitch controller 10 for controlling the pitch of fan blades 11 which are driven by a free turbine 13 which is driven by hot gas from core engine 12. The engine having the core engine 12 and a free turbine 13 preferably is of the type having a pair of counter rotating unshrouded fans. In a preferred implementation of the invention, the power applied to shaft 15 is derived from rotation of an unshrouded fan blade assembly which is driven by the free turbine 13. The pitch controller 10 has a hydraulic pump-motor combination 20 which is driven by a second output 21 from transmission 14. The shaft 15 is the first input to the transmission 14. The power applied by the second output 21 from transmission 14 to the hydraulic pump-motor combination 20 is applied by the first input shaft 15 to the transmission. The pitch controller 10 of the present invention eliminates the prior art hydraulic lines between the main hydraulic pump and the power drive unit to generate the hydraulic power for adjusting the pitch of the fan blades 11 by having the hydraulic pump-motor combination 20 dedicated exclusively to pitch adjustment which is separate from the main hydraulic power source on the aircraft used for powering items such as flight surfaces. Furthermore, control of the pitch adjuster may be simplified and a weight saving may be achieved.

The pitch controller 10 is powered by a small fraction of the propulsion power available to the free turbine 13. The control input to the pitch adjuster 16 is provided by drive shaft 18 which is the first output from transmission 14. A preferred embodiment of the transmission is described below in conjunction with FIG. 2. The ratio of the rotational velocity of free turbine 13 to the rotational velocity of input drive shaft 18 is maintained constant by the transmission 14 when a pitch control signal 28 from pitch control signal source 26 is commanding that the pitch of the blades 11 is not to change. The ratio of the rotational velocity of free turbine 13 to the rotational velocity of the input drive shaft 18 is caused to vary by the transmission 14 in direct proportion to the magnitude of the change in pitch commanded by the pitch control signal source 26. In other words the velocity of the shaft 18 is proportional to the first derivative of the pitch control signal 28. Although not illustrated, it should be understood that positional feedback is provided from the fan blades 11 to the source 26 so that the pitch control signal becomes constant when the fan blades assume their new commanded position. Furthermore, it should be understood that the generation of the pitch control signal 28 is a complex interaction of the pilot of the aircraft and various sensed parameters of aircraft operation such as altitude and velocity as is known regarding unshrouded external fan propulsion engines. The method of generation of the pitch control signal 28 is conventional and not per se part of the present invention.

The rotary power device 20 is connected to transmission 14 to receive drive power from the second output 21 of the transmission 14 and to provide a second input by shaft 25 which controls the rotational velocity of the first output 18. The rotary power device 20 includes a hydraulic pump 22 which is directly connected to a hydraulic motor 24 without any external hydraulic lines. The combination of the hydraulic pump 22 and hydraulic motor 24 are a torque amplifier which produces a second input to the transmission 14 on shaft 25 having a variable speed which is proportional to the change in pitch commanded by the pitch control signal 28. As illustrated in FIG. 1, the pitch control signal 28 is connected to the hydraulic pump 22 and the hydraulic motor 24. However, in practice, the pitch control signal may be applied to the hydraulic pump 22 to vary the pressure of the hydraulic fluid provided to the hydraulic motor 24 to control the rotational speed of shaft 25 or to the hydraulic motor 24 to directly control the rotational velocity of the shaft 25. The control of the hydraulic pump 22 and hydraulic motor 24 in the aforementioned manner is conventional and is not further discussed herein.

Conceptually, the present invention operates as follows. Input drive power is provided by direct mechanical coupling on input drive shaft 15 from the free turbine 13. Input drive shaft 15 has a rotational speed proportional to the rotational velocity of the fan blades. Rotary power from the input drive shaft 15 is applied by drive shaft 21 to the hydraulic pump 22 of rotary power device 20 through transmission 14. A change in the rotational velocity of shaft 18 is directly proportional to a change in the rotational velocity of the shaft 25 which in turn is directly proportional to change in pitch commanded by the pitch control signal 28.

Under normal operation, when the pitch of the fan blades 11 is to remain constant, the shaft 18 rotates with a velocity such that a fixed ratio of the velocities of the free turbine 13 to shaft 18 exists and preferably the rotational velocity of the free turbine 13 and the shaft 18 is identical. Upon the receipt of a change in pitch from the pitch control signal 28, the rotary power device 20 varies the velocity of shaft 25 in direct proportion to the commanded change in pitch. The change in rotational velocity imparted to the shaft 18 by the transmission 14 causes the shaft 18 to rotate at a rotational speed different from the rotational velocity of the free turbine 13. The difference in rotational velocity between the shaft 18 and the free turbine 13 causes the pitch adjuster 16 to adjust the pitch of the plurality of blades 11 of the fan in proportion to the change in pitch commanded by the pitch control signal 28.

Figure 2:
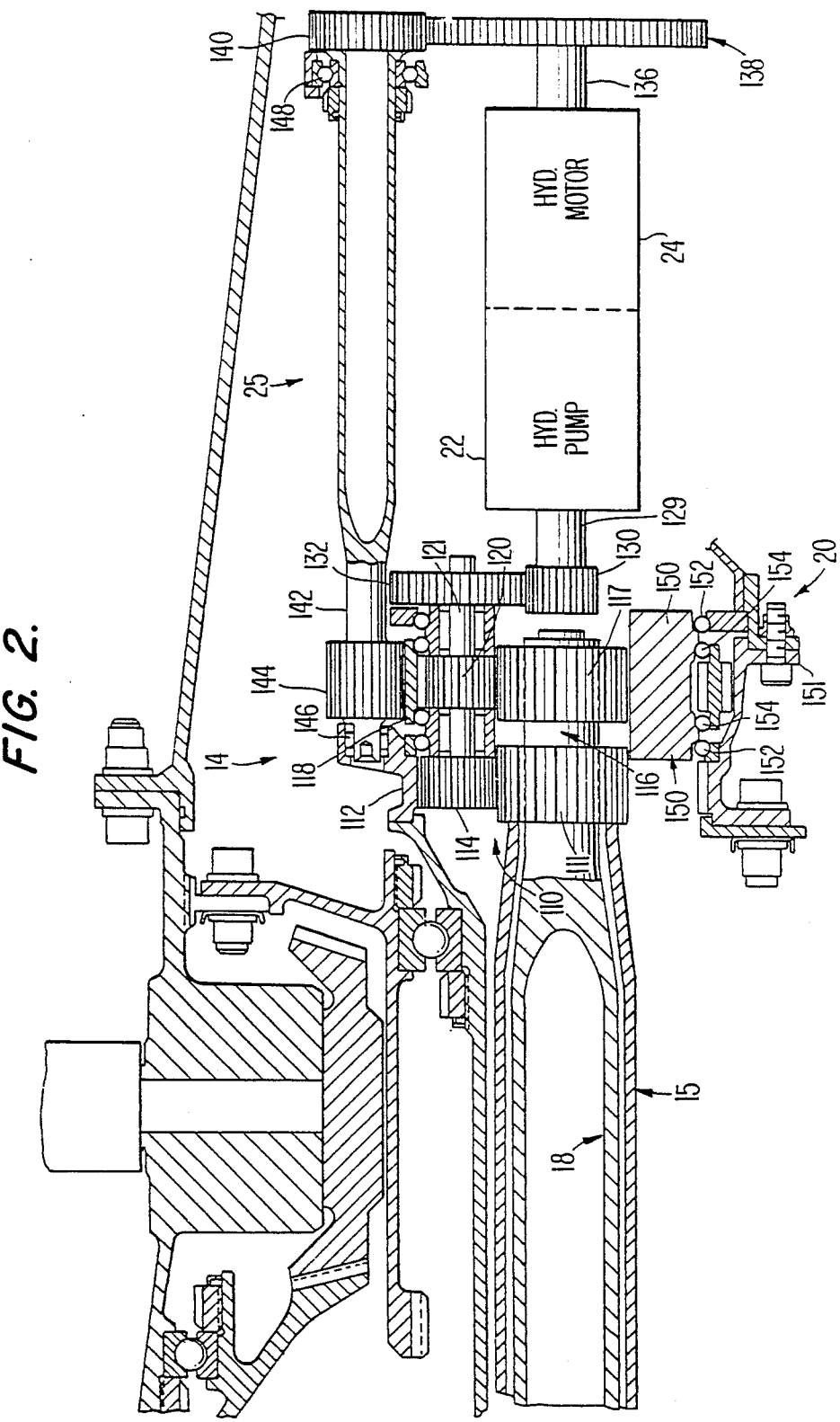
FIG. 2 is a partial longitudinal section of the embodiment of the present invention.

An embodiment of the present invention is shown in FIG. 2. Like reference numerals identify like parts in FIGS. 1 and 2. It should be noted that the pitch control signal source 26 and the pitch control signal 28 have been omitted from FIG. 2. A first gear set 110 is provided which includes a first sun gear 111, a first ring gear 112 and a first set of planetary gears 114 meshing with the first sun gear 111 and the first ring 112 gear. The first ring gear 112 is fixed. A second gear set 116 is provided which includes a second sun gear 117, a second ring gear 118 and a second set of planetary gears 120 meshing with the second sun gear and the second ring gear 118. The second planetary gear set 120 orbits with the first planetary gear set 114 on a common shaft 121. External gear teeth are provided on the second ring gear 118 for meshing with a gear connected to the second input 25 of the transmission as described below.

Figure 3:
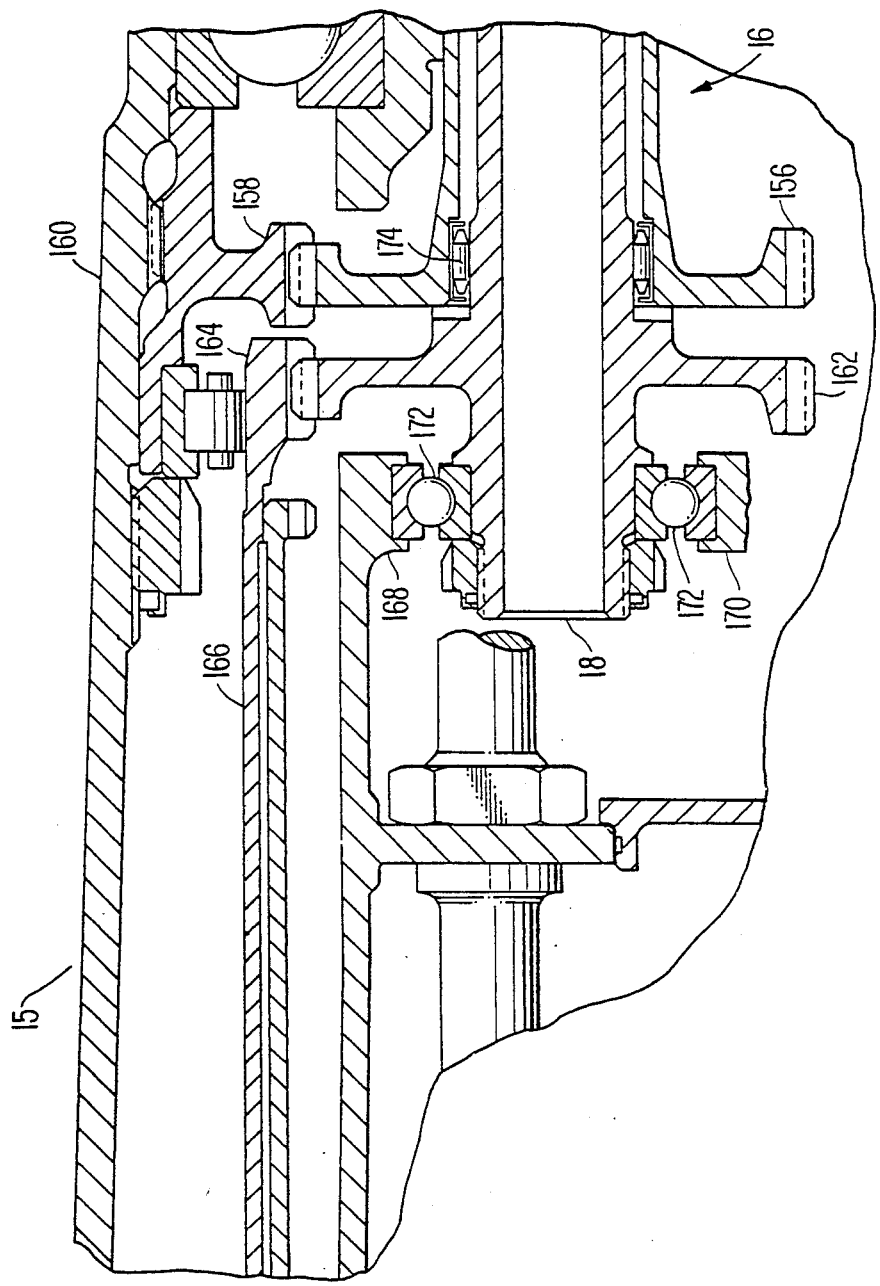
FIG. 3 is a partial longitudinal section of the remainder of the embodiments of the present invention illustrated in FIG. 2.

The main drive input 15, which is the first input to the transmission 14, is concentric with the first and second gear sets 110, 116. The main drive shaft 15 is coupled to the first sun gear 111 of the first gear set 110. The output 18 is concentric with input drive shaft 15. The shaft 18 is connected to the second sun gear 117 of the second gear set and to the pitch adjuster 16 as illustrated in FIG. 3. The shaft 15 and the shaft 18 are each coupled to the plurality of blades 11 of a fan through the pitch adjuster 16.

The rotary power device 20 is described as follows. Hydraulic pump 22 of conventional construction is coupled to the shaft 15 and hydraulic motor 24 of conventional construction is connected to the hydraulic pump 22 to provide pressurized hydraulic fluid to cause rotation of the hydraulic motor 24, and is connected to the shaft 25 of the transmission 14 as described below. The hydraulic pump 22 has an input pump shaft 129. The hydraulic pump 22 is coupled to the shaft 15 through gearing which includes a pump sun gear 130 connected to pump shaft 129. The sun gear 130 meshes with a third planetary gear set 132. Third planetary gear set 132 orbits with the first planetary gear set 114 and the second planetary gear set 120 on shaft 121 around the sun gears 111, 117 and 130. Rotary power from the shaft 15 continually drives the pump shaft 129 through the planetary gear set 114, shaft 121 and planetary gear set 132. Hydraulic pump 22 may employ a conventional variable swash plate for controlling both speed and the direction of relative rotation of the hydraulic motor 24. Output shaft 136 of the hydraulic motor 24 is connected to a spur gear 138. The spur gear 138 meshes with a spur gear 140 of a drive shaft 142. A second spur gear 144 is connected to the drive shaft 142 and meshes with the aforementioned external gear teeth of the second ring gear 118. Both ends of drive shaft 142 are journalled by bearings 146 and 148. Planetary gear sets 114 and 120 are positioned by a carrier 150 which is in turn supported in housing 151 by bearings 152. Bearings 154 support the second ring gear 118. The pump sun gear 130 and the third planetary gear set 132 are chosen to optimize the pump speed relative to the speed of the shaft 15.

The gear ratio between the first planetary gear set 114 and the fixed ring gear 112 and the second planetary gear set 120 and the second rotatable ring gear 118 determines the shaft velocity of the second input 25 to the transmission 14 which is necessary to maintain a constant pitch. If the desired speed of the input shaft 25 to maintain a constant pitch is to be zero, the gear ratio between the first planetary set 114 and ring gear 112 and the second planetary set 120 and ring gear 118 is identical to maintain the velocity of the output shaft 18 identical to input shaft 15. If the desired speed of the input shaft 25 to maintain a constant pitch is not to be zero, which may be desirable for operation of hydraulic motor 24 to maintain a hydrodynamic bearing between parts which are movable with respect to each other, the gear ratio between the first planetary set 114 and the ring gear 111 and the second planetary gear set 12 and ring gear 118 is chosen to be different to maintain the velocity of the shaft 18 identical to the shaft 15. As stated above, the transmission 14 may further be chosen to maintain a constant ratio between the rotational velocities of shafts 15 and 18 which is not unity when a change in pitch is not commanded by the pitch control signal 28 and further maintain a variable speed ratio between the rotational velocities of shafts 15 and 18 in response to the magnitude of a change in pitch commanded by the pitch control signal 28.

The pitch adjuster 16 is described with reference to FIG. 3 as follows. It should be understood that the mechanical linkage between fan blade and the shaft 18 is only partially illustrated with the blades being omitted given the fact that the linkage is known in the art. The input shaft 15 is connected to a third spur gear 156 which meshes with a third ring gear 158 which is attached to outer wall 160. Outer wall 160 is a part of the input shaft 15 which rotates with the free turbine 13. The output shaft 18 is connected to a fourth spur gear 162 which meshes with a fourth ring gear 164. The fourth ring gear 164 is attached to an end structure 166 that is coupled to the blades and the linkages which have been omitted. The input shaft 15 and the output shaft 18 are coupled by the third and fourth spur gears 156 and 162 and the third and fourth ring gears 158 and 164 to the fan blades in a conventional manner such that when both shafts operate at identical speeds, no change in the pitch of the blades occurs. The shaft 18 is rotatably journalled at points 168 and 170 by ball bearings 172. The shaft 15 is rotatably supported about the shaft 18 by bearings 174.

The apparatus of the present invention for controlling pitch variations of a plurality of blades of a fan operates as follows. The operation is described with reference to the embodiment in which the shaft 25 has a zero rotational velocity in response to a pitch control signal 28 which is commanding a constant pitch but it should be understood that operation would be similar in the embodiment in which the shaft 25 has a non zero rotational velocity in response to a pitch control signal which is commanding a constant pitch. A pitch control signal 28 supplied to the hydraulic motor 24, which commands a change in pitch that causes the hydraulic motor output shaft 136 to rotate with a velocity proportional to the commanded change in pitch. The rotation of hydraulic motor output shaft 136 causes the hydraulic shaft spur gear 138 to turn. The hydraulic shaft spur gear 138 meshes with a drive spur gear 140 which is coupled to drive shaft 142 thereby turning the drive shaft 142. Drive shaft 142 coupled to spur gear 144 causes the second ring gear 118 to rotate. When the pitch control signal 28 is not commanding a change in pitch, the shaft 18 rotates at the same rotational velocity as the shaft 15. In addition, the rotational velocity of the second ring gear 118 matches the rotational speed of the first ring gear 112. As stated above, since the first ring gear 112 is fixed, the rotational speed of the second ring gear 118 is 0.

Relative to the input shaft 15, turns are added to or subtracted from the output shaft 18 based on the number of turns of the second ring gear 118 caused by the rotation of spur gear 144. The turns added to or subtracted from the shaft 18 are equal to the number of turns of the second ring gear 118 (relative to ground) multiplied by the ratio of the internal tooth count of the second ring gear 118 divided by the external tooth count of the second sun gear 116. For example, if plus or minus 100 turns of the shaft 18 relative to the shaft 15 are required to position the blades 11 to their travel limits from a mid position, and assuming that the internal tooth count of the second ring gear 118 is 67, and the external tooth count of the second sun gear is 29, then the second ring gear 118 would require: $\pm 100 \times (29/67) = \pm 43.3$ turns. The difference in rotational velocity between the shaft 15 and the shaft 18 causes the pitch adjuster 16 to adjust the pitch of the blades 11 of the fan of the turbine propulsion engine.

While the invention has been described in terms of this preferred embodiment, numerous modifications may be made thereto without departure from the spirit and scope of the invention. It is intended that all such modifications fall within the scope of the appended claims.

I claim:

1. A pitch controller for varying a pitch of a plurality of blades in a fan powered by a turbine, the pitch controller comprising:
   pitch adjusting means having an input means for controlling the pitch of the blades, the pitch of the blades being constant in response to a rotational velocity of the input means and a rotational velocity of a power source means for applying rotary power to the blades having a constant ratio, and the pitch of the blades changing in response to the rotational velocity of the input means and the rotational velocity of the power source means changing in ratio;
   a transmission means having a first input means from the power source means for applying rotary power and a second input means for controlling a rotational velocity of a first output means in proportion to a change in velocity of the second input means, and a second output means; and
   means for providing the input from the second input means to the transmission means, the rotational velocity of the second input from the second input means to the transmission means varying in proportion to a change in an applied pitch control signal for controlling the pitch of the blades, the output from the first output means of the transmission means providing torque to the pitch adjusting mean to control an adjustment of pitch of the blades.

2. A pitch controller in accordance with claim 1, wherein;
   the rotational velocity of the input of the second input means to the transmission means is zero when the pitch control signal is commanding a constant pitch of the blades.

3. A pitch controller in accordance with claim 1, wherein;
   the rotational velocity of the input of the second input means to the transmission means is fixed and non-zero when the pitch control signal is commanding a constant pitch of the blades and varies from a fixed velocity in response to a pitch control signal commanding a change in pitch of the blades.

4. A pitch controller in accordance with claim 2, wherein the means for providing the input from the second input means to the transmission means comprises:
   a hydraulic pump means powered by the second output means of the transmission means for providing pressurized hydraulic fluid in response to an applied torque;
   a hydraulic motor means directly connected to the hydraulic pump means for providing rotary power to the second input means of the transmission means; and
   a pitch control signal source means for applying the pitch control signal to the hydraulic motor means for varying the rotational velocity of the hydraulic motor means in proportion to a pitch control signal to change the pitch of the blades.

5. A pitch controller in accordance with claim 3, wherein the means for providing the input from the second input means to the transmission means comprises:
   a hydraulic pump means powered by the second output means of the transmission means for providing pressurized hydraulic fluid in response to an applied torque;
   a hydraulic motor means directly connected to the hydraulic pump means for providing rotary power to the second input means of the transmission means; and
   a pitch control signal source means for applying the pitch control signal to the hydraulic pump means for varying the pressure of the hydraulic fluid applied to the hydraulic motor means in proportion to a pitch control signal to change the pitch of the blades.

6. A pitch controller according to claim 2, wherein the transmission means comprises:
   first, second, and third sets of gear means;

the first set of gear means being connected to the power source means;

the second set of gear means being connected to the first set of gear means, the means for providing the input of the second input means to the transmission means, and to the first output means of the transmission means; and the third set of gear means being connected to the power source means and the hydraulic pump means.

7. A pitch controller in accordance with claim 6, wherein the first set of gear means comprises:
a first sun gear;
a first ring gear; and
a first planetary gear set meshing with the first sun gear and the first rain gear, and wherein the first sun gear is coupled to the power source means.

8. A pitch controller in accordance with claim 7, wherein:
the first ring gear is fixed.

9. A pitch controller in accordance with claim 8, wherein the second set of gear means comprises:
a second sun gear;
a second ring gear; and
a second planetary gear set meshing with the second gear and the second ring gear, the second planetary gear set orbiting with the first planetary gear set, and wherein the second sun gear is coupled to the first output means of the transmission means.

10. A pitch controller in accordance with claim 9, wherein the third set of gear means comprises:
a third sun gear; and
a third planetary gear set, the third sun gear being coupled to an input drive shaft of the hydraulic pump means and the third planetary gear set orbiting with the first and second planetary gear sets.

11. A pitch controller in accordance with claim 10, wherein the transmission means further comprises:
external gear teeth disposed on an outer surface of the second ring gear; and
a first gear meshing with the external gear teeth of the second ring gear with the first gear being connected to the second input means of the transmission means.

12. A pitch controller in accordance with claim 11, wherein:
the first gear is connected to an output shaft of the hydraulic motor means by a drive shaft which is coupled to a second gear, the second gear meshing with a third gear which is coupled to the output shaft of the hydraulic motor means.

13. A pitch controller in accordance with claim 9, wherein:
an identical gear ratio exists between the first planetary gear set and the first ring gear and the second planetary gear set and the second ring gear.

14. A pitch controller in accordance with claim 3, wherein the transmission means comprises:
first, second, and third sets of gear means;
the first set of gear means being connected to the power source means;

the second set of gear means being connected to the first set of gear means, the means for providing the input from the second input means to the transmission means, and to the first output means of the transmission means;

the third set of gear means being connected to the power source means and the hydraulic pump means.

15. A pitch controller in accordance with claim 14, wherein the first set of gear means comprises:
a first sun gear;
a first ring gear; and
a first planetary gear set meshing with the first sun gear and the first ring gear, and wherein the first sun gear is coupled to the power source means.

16. A pitch controller in accordance with claim 15, wherein:
the first ring gear is fixed.

17. A pitch controller in accordance with claim 16, wherein the second set of gear means comprises:
a second sun gear;
a second ring gear; and
a second planetary gear set meshing with the second sun gear and the second ring gear, the second planetary gear set orbiting with the first planetary gear set, and wherein the second sun gear is coupled to the first output means of the transmission means.

18. A pitch controller in accordance with claim 17, wherein the third set of gear means comprises:
a third sun gear; and
a third planetary gear set, the third sun gear being coupled to an input drive shaft of the hydraulic pump means, and the third planetary gear set orbiting with the first and second planetary gear sets.

19. A pitch controller in accordance with claim 18, wherein the transmission means further comprises:
external gear teeth disposed on an outer surface of the second rain gear; and
a first gear meshing with the external teeth of the second rain gear, and wherein the first gear is connected to the second input means of the transmission means.

20. A pitch controller in accordance with claim 19, wherein:
the first gear is connected to an output shaft of the hydraulic motor means by a drive shaft which is coupled to a second gear, the second gear meshing with a third gear which is coupled to the output shaft of the hydraulic motor means.

21. A pitch controller in accordance with claim 20, wherein:
a different gear ratio exists between the first planetary gear set and the first ring gear and second planetary gear set and the second ring gear.

* * * * *